US012087314B2

(12) United States Patent
Grancharov et al.

(10) Patent No.: US 12,087,314 B2
(45) Date of Patent: Sep. 10, 2024

(54) AUDIO ENCODING/DECODING BASED ON AN EFFICIENT REPRESENTATION OF AUTO-REGRESSIVE COEFFICIENTS

(71) Applicant: Telefonaktiebolaget LM Ericsson (publ), Stockholm (SE)

(72) Inventors: Volodya Grancharov, Solna (SE); Sigurdur Sverrisson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/103,871

(22) Filed: Jan. 31, 2023

(65) Prior Publication Data

US 2023/0178087 A1 Jun. 8, 2023

Related U.S. Application Data

(63) Continuation of application No. 17/199,869, filed on Mar. 12, 2021, now Pat. No. 11,594,236, which is a (Continued)

(51) Int. Cl.
*G10L 19/038* (2013.01)
*G10L 19/02* (2013.01)
(Continued)

(52) U.S. Cl.
CPC ........ *G10L 19/038* (2013.01); *G10L 19/0204* (2013.01); *G10L 19/032* (2013.01); (Continued)

(58) Field of Classification Search
CPC . G10L 19/038; G10L 19/0204; G10L 19/032; G10L 19/06; G10L 21/038; G10L 2019/001
(Continued)

(56) References Cited

U.S. PATENT DOCUMENTS 7,921,007 B2 4/2011 Van De Par et al.
9,269,364 B2 2/2016 Grancharov et al.
(Continued)

FOREIGN PATENT DOCUMENTS

EP 1818913 A1 8/2007
WO 0239430 A1 5/2002

OTHER PUBLICATIONS

3GPP, "3rd Generation Partnership Project; Technical Specification Group Services and System Aspects; Mandatory Speech Codec speech processing functions; Adaptive Multi-Rate (AMR) speech codec; Transcoding functions (Release 7)", 3GPP TS 26.090 V7.0.0, Jun. 2007, 1-15.
(Continued)

*Primary Examiner* — Thierry L Pham
(74) *Attorney, Agent, or Firm* — Murphy, Bilak & Homiller, PLLC

(57) ABSTRACT

An encoder for encoding a parametric spectral representation (f) of auto-regressive coefficients that partially represent an audio signal. The encoder includes a low-frequency encoder configured to quantize elements of a part of the parametric spectral representation that correspond to a low-frequency part of the audio signal. It also includes a high-frequency encoder configured to encode a high-frequency part ($f^H$) of the parametric spectral representation (f) by weighted averaging based on the quantized elements ($\hat{f}^L$) flipped around a quantized mirroring frequency ($\hat{f}_m$), which separates the low-frequency part from the high-frequency part, and a frequency grid determined from a frequency grid codebook in a closed-loop search procedure. Described are also a corresponding decoder, corresponding encoding/decoding methods and UEs including such an encoder/decoder.

20 Claims, 10 Drawing Sheets

Related U.S. Application Data continuation of application No. 16/832,597, filed on Mar. 27, 2020, now Pat. No. 11,011,181, which is a continuation of application No. 14/994,561, filed on Jan. 13, 2016, now abandoned, which is a continuation of application No. 14/355,031, filed as application No. PCT/SE2012/050520 on May 15, 2012, now Pat. No. 9,269,364.

(60) Provisional application No. 61/554,647, filed on Nov. 2, 2011.

(51) Int. Cl.

| | |
|---|---|
| ***G10L 19/032*** | (2013.01) |
| ***G10L 19/06*** | (2013.01) |
| ***G10L 21/038*** | (2013.01) |
| *G10L 19/00* | (2013.01) |

(52) U.S. Cl.

CPC ............ *G10L 19/06* (2013.01); *G10L 21/038* (2013.01); *G10L 2019/001* (2013.01)

(58) Field of Classification Search

USPC .......................................................... 704/500

See application file for complete search history.

(56) References Cited

U.S. PATENT DOCUMENTS

| | | | | |
|---|---|---|---|---|
| 11,594,236 | B2 * | 2/2023 | Grancharov ............ | G10L 19/06 |
| 2007/0223577 | A1 | 9/2007 | Ehara et al. | |
| 2007/0271092 | A1 | 11/2007 | Ehara et al. | |
| 2008/0120118 | A1 | 5/2008 | Choo et al. | |
| 2011/0305352 | A1 | 12/2011 | Villemoes et al. | |

OTHER PUBLICATIONS

Budsabathon , et al., "Bandwith Extension with Hybrid Signal Extrapolation for Audio Coding", Institute of Electronics, Information and Communication Engineers. IEICE Trans. Fundamentals vol. E90-A, No. 8., Aug. 2007, 1564-1569.

Chen , et al., "HMM-Based Frequency Bandwith Extension for Speech Enhancement Using Line Spectral Frequencies", IEEE ICASSP 2004., 2004, 709-712.

Epps, J. , et al., "Speech Enhancement Using STC-Based Bandwith Extension", Conference Proceedings Article, Oct. 1, 1998, 1-4.

Hang , et al., "A Low Bit Rate Audio Bandwith Extension Method for Moblie Communication", Advances in Multimedia Information Processing—PCM 2008,Springer-Verlag Berlin Heidelberg, vol. 5353, Dec. 9, 2008, 778-781.

Wakami, Naoki , et al., "High-quality Audio-Coding at LessThan 64 Kbit/s by Using Transform-Domain Weighted Interleave Vector Quantization (TWINVQ)", IEEE, 1995, 3095-3098.

Kabal, Peter , et al., "The Computation of Line Spectral Frequencies Using Chebyshev Polynomials", IEEE Transactions of Acoustics, Speech, and Signal Processing, vol. ASSP-34, No. 6, Dec. 1986, 1419-1426.

Makhoul, John , "Linear Prediction: A Tutorial Review", Proceedings of the IEEE, vol. 63, No. 4, Apr. 1975, 561-580.

* cited by examiner

AUDIO ENCODING/DECODING BASED ON AN EFFICIENT REPRESENTATION OF AUTO-REGRESSIVE COEFFICIENTS

TECHNICAL FIELD

The technology disclosed herein relates to audio encoding/decoding based on an efficient representation of auto-regression (AR) coefficients.

BACKGROUND

AR analysis is commonly used in both time [1] and transform domain audio coding [2]. Different applications use AR vectors of different length. The model order is mainly dependent on the bandwidth of the coded signal; from 10 coefficients for signals with a bandwidth of 4 kHz, to 24 coefficients for signals with a bandwidth of 16 kHz. These AR coefficients are quantized with split, multistage vector quantization (VQ), which guarantees nearly transparent reconstruction. However, conventional quantization schemes are not designed for the case when AR coefficients model high audio frequencies, for example above 6 kHz, and when the quantization is operated with very limited bit-budgets (which do not allow transparent coding of the coefficients). This introduces large perceptual errors in the reconstructed signal when these conventional quantization schemes are used at non-optimal frequency ranges and with non-optimal bitrates.

SUMMARY

An object of the disclosed technology is a more efficient quantization scheme for the auto-regressive coefficients. This objective may be achieved with several of the embodiments disclosed herein.

A first aspect of the technology described herein involves a method of encoding a parametric spectral representation of auto-regressive coefficients that partially represent an audio signal. An example method includes the following steps: encoding a low-frequency part of the parametric spectral representation by quantizing elements of the parametric spectral representation that correspond to a low-frequency part of the audio signal; and encoding a high-frequency part of the parametric spectral representation by weighted averaging based on the quantized elements flipped around a quantized mirroring frequency, which separates the low-frequency part from the high-frequency part, and a frequency grid determined from a frequency grid codebook in a closed-loop search procedure.

A second aspect of the technology described herein involves a method of decoding an encoded parametric spectral representation of auto-regressive coefficients that partially represent an audio signal. An example method includes the following steps: reconstructing elements of a low-frequency part of the parametric spectral representation corresponding to a low-frequency part of the audio signal from at least one quantization index encoding that part of the parametric spectral representation; and reconstructing elements of a high-frequency part of the parametric spectral representation by weighted averaging based on the decoded elements flipped around a decoded mirroring frequency, which separates the low-frequency part from the high-frequency part, and a decoded frequency grid.

A third aspect of the technology described herein involves an encoder for encoding a parametric spectral representation of auto-regressive coefficients that partially represent an audio signal. An example encoder includes: a low-frequency encoder configured to encode a low-frequency part of the parametric spectral representation by quantizing elements of the parametric spectral representation that correspond to a low-frequency part of the audio signal; and a high-frequency encoder configured to encode a high-frequency part of the parametric spectral representation by weighted averaging based on the quantized elements flipped around a quantized mirroring frequency, which separates the low-frequency part from the high-frequency part, and a frequency grid determined from a frequency grid codebook in a closed-loop search procedure. A fourth aspect of the technology described herein involves a UE including the encoder in accordance with the third aspect.

A fifth aspect involves a decoder for decoding an encoded parametric spectral representation of auto-regressive coefficients that partially represent an audio signal. An example decoder includes: a low-frequency decoder configured to reconstruct elements of a low-frequency part of the parametric spectral representation corresponding to a low-frequency part of the audio signal from at least one quantization index encoding that part of the parametric spectral representation; and a high-frequency decoder configured to reconstruct elements of a high-frequency part of the parametric spectral representation by weighted averaging based on the decoded elements flipped around a decoded mirroring frequency, which separates the low-frequency part from the high-frequency part, and a decoded frequency grid. A sixth aspect of the technology described herein involves a UE including the decoder in accordance with the fifth aspect.

The technology detailed below provides a low-bitrate scheme for compression or encoding of auto-regressive coefficients. In addition to perceptual improvements, the technology also has the advantage of reducing the computational complexity in comparison to full-spectrum-quantization methods.

BRIEF DESCRIPTION OF THE DRAWINGS

The disclosed technology, together with further objects and advantages thereof, may best be understood by making reference to the following description taken together with the accompanying drawings, in which.

DETAILED DESCRIPTION

The disclosed technology requires as input a vector a of AR coefficients (another commonly used name is linear prediction (LP) coefficients). These are typically obtained by first computing the autocorrelations r(j) of the windowed audio segment s (n), n=1, . . . , N, i.e.:

$$r(j)=\sum_{n=j}^{N} s(n)s(n-j),\ j=0,\ \ldots\ ,M \tag{1}$$

where M is pre-defined model order. Then the AR coefficients a are obtained from the autocorrelation sequence r(j) through the Levinson-Durbin algorithm [3].

In an audio communication system AR coefficients have to be efficiently transmitted from the encoder to the decoder part of the system. In the disclosed technology this is achieved by quantizing only certain coefficients, and representing the remaining coefficients with only a small number of bits.

Encoder

Figure 1:
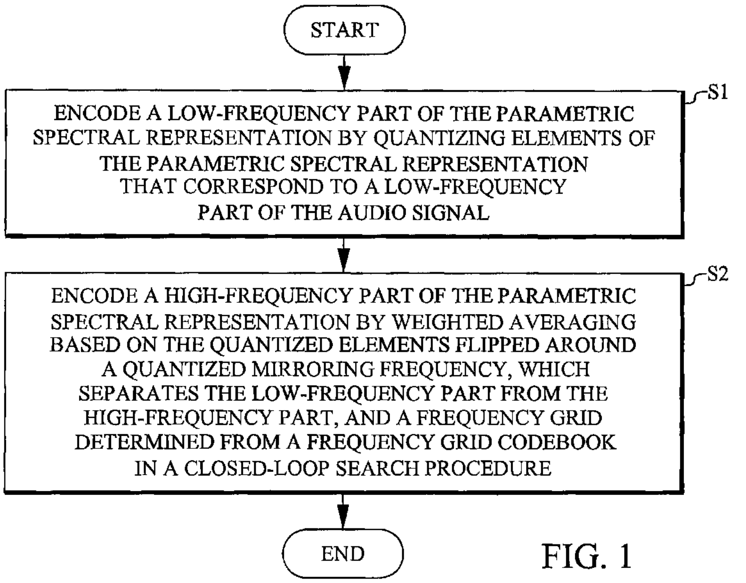
FIG. 1 is a flow chart of the encoding method in accordance with the disclosed technology.

FIG. 1 is a flow chart of the encoding method in accordance with the disclosed technology. Step S1 encodes a low-frequency part of the parametric spectral representation by quantizing elements of the parametric spectral representation that correspond to a low-frequency part of the audio signal. Step S2 encodes a high-frequency part of the parametric spectral representation by weighted averaging based on the quantized elements flipped around a quantized mirroring frequency, which separates the low-frequency part from the high-frequency part, and a frequency grid determined from a frequency grid codebook in a closed-loop search procedure.

Figure 2:
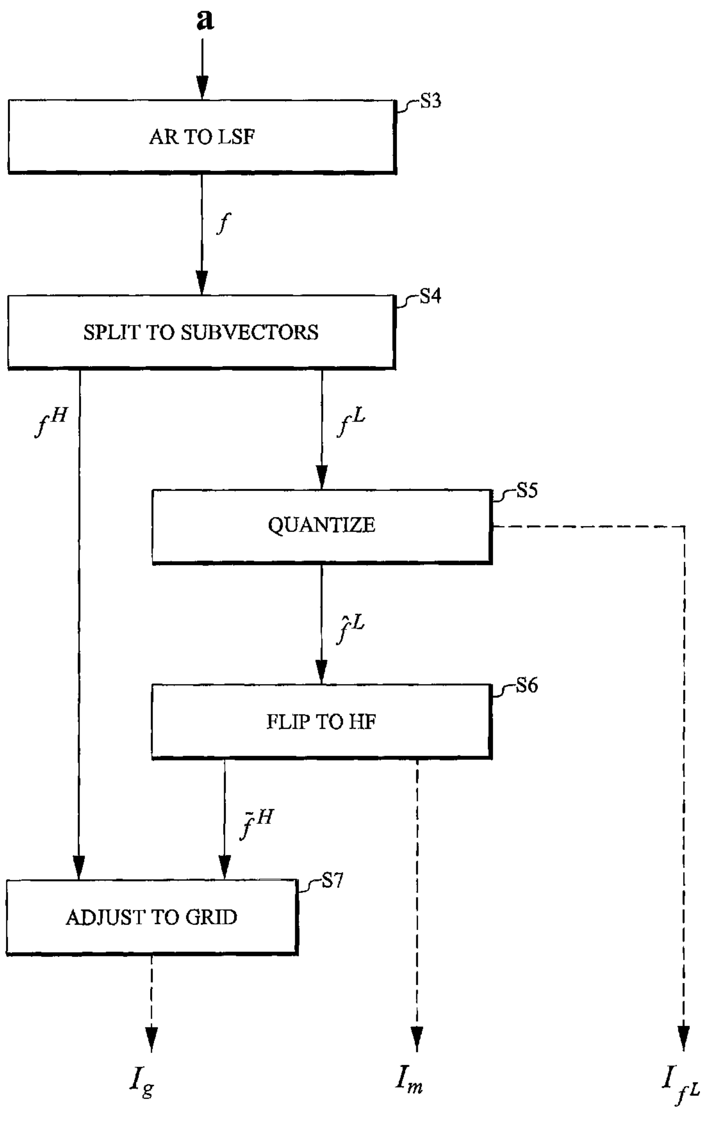
FIG. 2 illustrates an embodiment of the encoder side method of the disclosed technology.

FIG. 2 illustrates steps performed on the encoder side of an embodiment of the disclosed technology. First the AR coefficients are converted to an Line Spectral frequencies (LSF) representation in step S3, e.g. by the algorithm described in [4]. Then the LSF vector f is split into two parts, denoted as low (L) and high-frequency (H) parts in step S4. For example in a 10 dimensional LSF vector the first 5 coefficients may be assigned to the L subvector $f^L$ and the remaining coefficients to the H subvector $f^H$.

Although the disclosed technology will be described with reference to an LSF representation, the general concepts may also be applied to an alternative implementation in which the AR vector is converted to another parametric spectral representation, such as Line Spectral Pair (LSP) or Immitance Spectral Pairs (ISP) instead of LSF.

Only the low-frequency LSF subvector $f^L$ is quantized in step S5, and its quantization indices $I_{f^L}$ are transmitted to the decoder. The high-frequency LSFs of the subvector $f^H$ are not quantized, but only used in the quantization of a mirroring frequency $f_m$(to $\hat{f}_m$), and the closed loop search for an optimal frequency grid $g^{opt}$ from a set of frequency grids $g^i$ forming a frequency grid codebook, as described with reference to equations (2)-(13) below. The quantization indices $I_m$ and $I_g$ for the mirroring frequency and optimal frequency grid, respectively, represent the coded high-frequency LSF vector $f^H$ and are transmitted to the decoder. The encoding of the high-frequency subvector $f^H$ will occasionally be referred to as "extrapolation" in the following description.

In the disclosed embodiment quantization is based on a set of scalar quantizers (SQs) individually optimized on the statistical properties of the above parameters. In an alternative implementation the LSF elements could be sent to a vector quantizer (VQ) or one can even train a VQ for the combined set of parameters (LSFs, mirroring frequency, and optimal grid).

Figure 3:
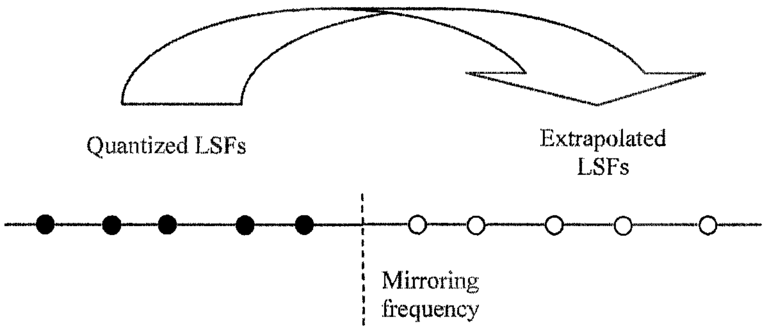
FIG. 3 illustrates flipping of quantized low-frequency LSF elements (represented by black dots) to high frequency by mirroring them to the space previously occupied by the upper half of the LSF vector.

The low-frequency LSFs of subvector $f^L$ are in step S6 flipped into the space spanned by the high-frequency LSFs of subvector $f^H$. This operation is illustrated in FIG. 3. First the quantized mirroring frequency $\hat{f}_m$ is calculated in accordance with:

$$\hat{f}_m=Q(f(M/2)-\hat{f}(M/2-1))+\hat{f}(M/2-1) \tag{2}$$

where f denotes the entire LSF vector, and Q(•) is the quantization of the difference between the first element in $f^H$ (namely f(M/2)) and the last quantized element in $f^L$ (namely $\hat{f}(M/2-1)$), and where M denotes the total number of elements in the parametric spectral representation.

Next the flipped LSFs $f_{flip}(k)$ are calculated in accordance with:

$$f_{flip}(k)=2\hat{f}_m-\hat{f}(M/2-1-k),0\le k\le M/2-1 \tag{3}$$

Then the flipped LSFs are rescaled so that they will be bound within the range [0 . . . 0.5] (as an alternative the range can be represented in radians as [0 . . . π]) in accordance with:

$$\tilde{f}_{flip}(k)=\begin{cases}(f_{flip}(k)-f_{flip}(0))\cdot(f_{max}-\hat{f}_m)/\hat{f}_m+f_{flip}(0), & \hat{f}_m>0.25\\ f_{flip}(k), & \text{otherwise}\end{cases} \tag{4}$$

The frequency grids $g^i$ are resealed to fit into the interval between the last quantized LSF element $\hat{f}(M/2-1)$ and a maximum grid point value $g_{max}$, i.e.:

$$\tilde{g}^i(k)=g^i(k)\cdot(g_{max}-\hat{f}(M/2-1))+\hat{f}(M/2-1) \tag{5}$$

These flipped and resealed coefficients $\tilde{f}_{flip}(k)$ (collectively denoted $\tilde{f}^H$ in FIG. 2) are further processed in step S7 by smoothing with the rescaled frequency grids $\tilde{g}^i(k)$. Smoothing has the form of a weighted sum between flipped and rescaled LSFs $\tilde{f}_{flip}(k)$ and the rescaled frequency grids $\tilde{g}^i(k)$, in accordance with:

$$f_{smooth}(k)=[1-\lambda(k)]\tilde{f}_{flip}(k)+\lambda(k)\tilde{g}^i(k) \tag{6}$$

where λ(k) and [1−λ(k)] are predefined weights.

Since equation (6) includes a free index i, this means that a vector $f_{smooth}(k)$ will be generated for each $\tilde{g}^i(k)$. Thus, equation (6) may be expressed as:

$$f_{smooth}{}^i(k)=[1-\lambda(k)]\tilde{f}_{flip}(k)+\lambda(k)\tilde{g}^i(k) \tag{7}$$

The smoothing is performed step S7 in a closed loop search over all frequency grids $g^i$, to find the one that minimizes a pre-defined criterion (described after equation (12) below). For M/2=5 the weights λ(k) in equation (7) can be chosen as:

$$\lambda\{0.2,0.35,0.5,0.75,0.8\} \tag{8}$$

In an embodiment these constants are perceptually optimized (different sets of values are suggested, and the set that maximized quality, as reported by a panel of listeners, are finally selected). Generally the values of elements in λ increase as the index k increases. Since a higher index corresponds to a higher-frequency, the higher frequencies of the resulting spectrum are more influenced by $\tilde{g}^i(k)$ than by $\tilde{f}_{flip}$ (see equation (7)). This result of this smoothing or weighted averaging is a more flat spectrum towards the high frequencies (the spectrum structure potentially introduced by $\tilde{f}_{flip}$ is progressively removed towards high frequencies).

Here $g_{max}$ is selected close to but less than 0.5. In this example $g_{max}$ is selected equal to 0.49.

The method in this example uses 4 trained grids $g^i$ (less or more grids are possible). Template grid vectors on a range [0 . . . 1], pre-stored in memory, are of the form:

$$\begin{cases} g^1 = \{0.171274857, 0.35811835, 0.52369229, 0.71552804, 0.85539771\} \\ g^2 = \{0.16313042, 0.30782962, 0.43109281, 0.59395830, 0.81291897\} \\ g^3 = \{0.17172427, 0.33157177, 0.48528862, 0.66492442, 0.82952486\} \\ g^4 = \{0.16666667, 0.33333333, 0.50000000, 0.66666667, 0.83333333\} \end{cases} \tag{9}$$

If we assume that the position of the last quantized LSF coefficient $\hat{f}(M/2-1)$ is 0.25, the rescaled grid vectors take the form:

$$\begin{cases} \tilde{g}^1 = \{0.2915, 0.3359, 0.3757, 0.4217, 0.4553\} \\ \tilde{g}^2 = \{0.2892, 0.3239, 0.3535, 0.3925, 0.4451\} \\ \tilde{g}^3 = \{0.2912, 0.3296, 0.3665, 0.4096, 0.4491\} \\ \tilde{g}^4 = \{0.2900, 0.3300, 0.3700, 0.4100, 0.4500\} \end{cases} \tag{10}$$

Figure 4:
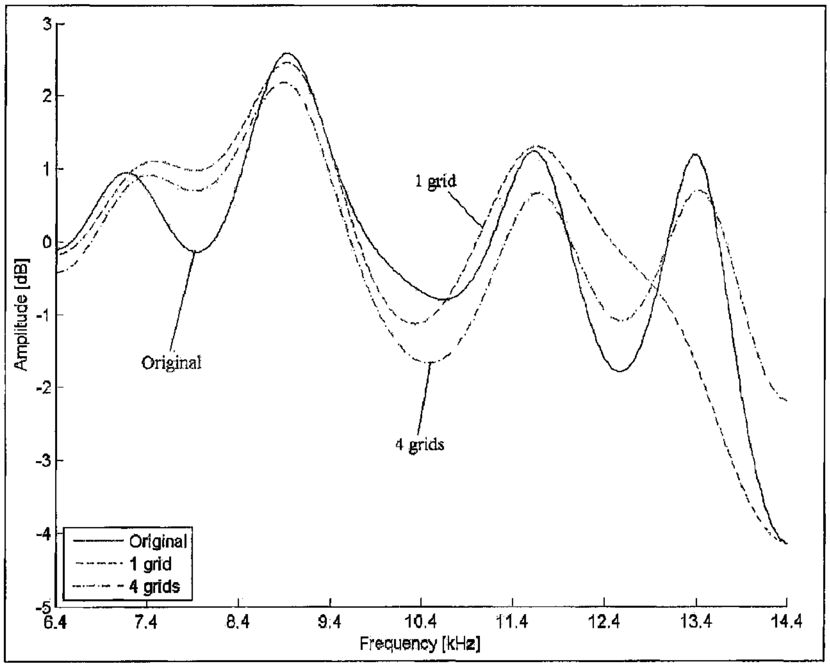
FIG. 4 illustrates the effect of grid smoothing on a signal spectrum.

An example of the effect of smoothing the flipped and rescaled LSF coefficients to the grid points is illustrated in FIG. 4. With increasing number of grid vectors used in the closed loop procedure, the resulting spectrum gets closer and closer to the target spectrum.

If $g_{max}$=0.5 instead of 0.49, the frequency grid codebook may instead be formed by:

$$\begin{cases} g^1 = \{0.15998503, 0.31215086, 0.47349756, 0.66540429, 0.84043882\} \\ g^2 = \{0.15614473, 0.30697672, 0.45619822, 0.62493785, 0.77798001\} \\ g^3 = \{0.14185823, 0.26648724, 0.39740108, 0.55685745, 0.74688616\} \\ g^4 = \{0.15416561, 0.27238427, 0.39376780, 0.59287916, 0.86613986\} \end{cases} \tag{11}$$

If we again assume that the position of the last quantized LSF coefficient $\hat{f}(M/2-1)$ is 0.25, the resealed grid vectors take the form:

$$\begin{cases} \tilde{g}^1 = \{0.28999626, 0.32803772, 0.36837439, 0.41635107, 0.46010970\} \\ \tilde{g}^2 = \{0.28903618, 0.32674418, 0.36404956, 0.40623446, 0.44449500\} \\ \tilde{g}^3 = \{0.28546456, 0.31662181, 0.34935027, 0.38921436, 0.43672154\} \\ \tilde{g}^4 = \{0.28854140, 0.31809607, 0.34844195, 0.39821979, 0.46653496\} \end{cases} \tag{12}$$

It is noted that the rescaled grids $\tilde{g}^i$ may be different from frame to frame, since $\hat{f}(M/2-1)$ in rescaling equation (5) may not be constant but vary with time. However, the codebook formed by the template grids $g^i$ is constant. In this sense the rescaled grids $\tilde{g}^i$ may be considered as an adaptive codebook formed from a fixed codebook of template grids $g^i$.

The LSF vectors $f_{smooth}{}^i$ created by the weighted sum in (7) are compared to the target LSF vector $f^H$, and the optimal grid $g^i$ is selected as the one that minimizes the mean-squared error (MSE) between these two vectors. The index opt of this optimal grid may mathematically be expressed as:

$$opt = \underset{i}{\operatorname{argmin}}\left(\sum_{k=0}^{M/2-1}\left(f^i_{smooth}(k) - f^H(k)\right)^2\right) \tag{13}$$

where $f^H$ (k) is a target vector formed by the elements of the high-frequency part of the parametric spectral representation.

In an alternative implementation one can use more advanced error measures that mimic spectral distortion (SD), e.g., inverse harmonic mean or other weighting on the LSF domain.

In an embodiment the frequency grid codebook is obtained with a K-means clustering algorithm on a large set of LSF vectors, which has been extracted from a speech database. The grid vectors in equations (9) and (11) are selected as the ones that, after rescaling in accordance with equation (5) and weighted averaging with $\tilde{f}_{flip}$ in accordance with equation (7), minimize the squared distance to $f^H$. In other words these grid vectors, when used in equation (7), give the best representation of the high-frequency LSF coefficients.

Figure 5:
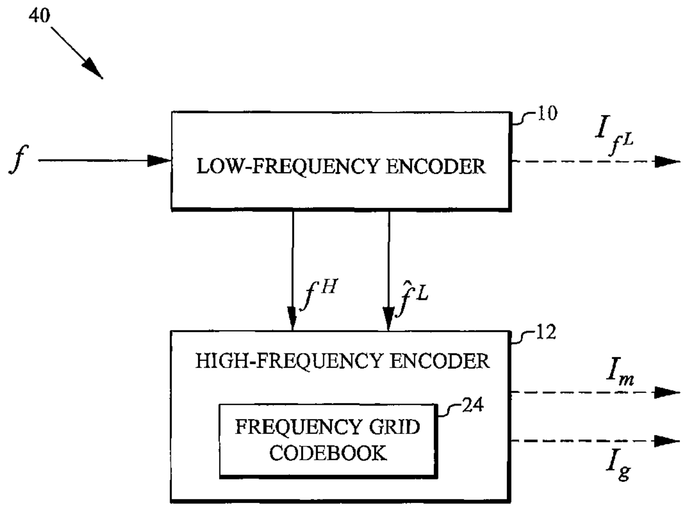
FIG. 5 is a block diagram of an embodiment of the encoder in accordance with the disclosed technology.

FIG. 5 is a block diagram of an embodiment of the encoder in accordance with the disclosed technology. The encoder 40 includes a low-frequency encoder 10 configured to encode a low-frequency part of the parametric spectral representation f by quantizing elements of the parametric spectral representation that correspond to a low-frequency part of the audio signal. The encoder 40 also includes a high-frequency encoder 12 configured to encode a high-frequency part $f^H$ of the parametric spectral representation by weighted averaging based on the quantized elements $\hat{f}^L$ flipped around a quantized mirroring frequency separating the low-frequency part from the high-frequency part, and a frequency grid determined from a frequency grid codebook 24 in a closed-loop search procedure. The quantized entities $\hat{f}^L$, $\hat{f}_m$, $g^{opt}$ are represented by the corresponding quantization indices $I_{f^L}$, $I_m$, $I_g$, which are transmitted to the decoder.

Figure 6:
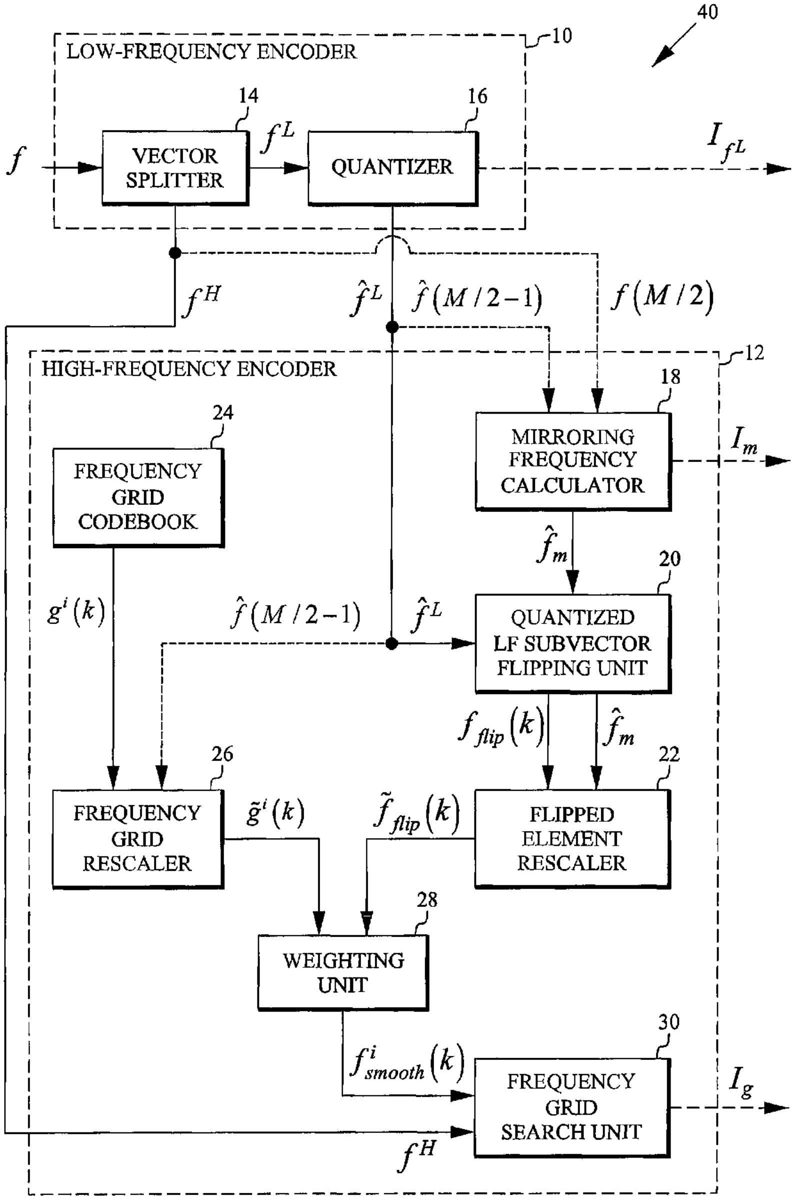
FIG. 6 is a block diagram of an embodiment of the encoder in accordance with the disclosed technology.

FIG. 6 is a block diagram of an embodiment of the encoder in accordance with the disclosed technology. The low-frequency encoder 10 receives the entire LSF vector f, which is split into a low-frequency part or subvector $f^L$ and a high-frequency part or subvector $f^H$ by a vector splitter 14. The low-frequency part is forwarded to a quantizer 16, which is configured to encode the low-frequency part $f^L$ by quantizing its elements, either by scalar or vector quantization, into a quantized low-frequency part or subvector $\hat{f}^L$. At least one quantization index $I_{f^L}$ (depending on the quantization method used) is outputted for transmission to the decoder.

The quantized low-frequency subvector $\hat{f}^L$ and the not yet encoded high-frequency subvector $f^H$ are forwarded to the high-frequency encoder 12. A mirroring frequency calculator 18 is configured to calculate the quantized mirroring frequency $\hat{f}_m$ in accordance with equation (2). The dashed lines indicate that only the last quantized element $\hat{f}(M/2-1)$ in $\hat{f}^L$ and the first element $f(M/2)$ in $f^H$ are required for this. The quantization index $I_m$ representing the quantized mirroring frequency $\hat{f}_m$ is outputted for transmission to the decoder.

The quantized mirroring frequency $\hat{f}_m$ is forwarded to a quantized low-frequency subvector flipping unit 20 configured to flip the elements of the quantized low-frequency subvector $\hat{f}^L$ around the quantized mirroring frequency $\hat{f}_m$ in accordance with equation (3). The flipped elements $f_{flip}(k)$ and the quantized mirroring frequency $\hat{f}_m$ are forwarded to a flipped element rescaler 22 configured to rescale the flipped elements in accordance with equation (4).

The frequency grids $g^i(k)$ are forwarded from frequency grid codebook 24 to a frequency grid rescaler 26, which also receives the last quantized element $\hat{f}(M/2-1)$ in $\hat{f}^L$. The rescaler 26 is configured to perform rescaling in accordance with equation (5).

The flipped and rescaled LSFs $\tilde{f}_{flip}(k)$ from flipped element rescaler 22 and the rescaled frequency grids $\tilde{g}^i(k)$ from frequency grid rescaler 26 are forwarded to a weighting unit 28, which is configured to perform a weighted averaging in accordance with equation (7). The resulting smoothed elements $f_{smooth}^{\ i}(k)$ and the high-frequency target vector $f^H$ are forwarded to a frequency grid search unit 30 configured to select a frequency grid $g^{opt}$ in accordance with equation (13). The corresponding index $I_g$ is transmitted to the decoder.

Decoder

Figure 7:
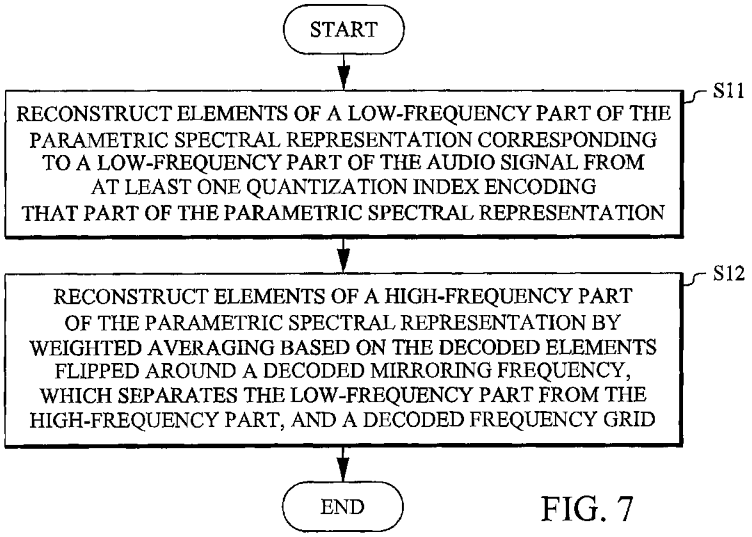
FIG. 7 is a flow chart of the decoding method in accordance with the disclosed technology.

FIG. 7 is a flow chart of the decoding method in accordance with the disclosed technology. Step S11 reconstructs elements of a low-frequency part of the parametric spectral representation corresponding to a low-frequency part of the audio signal from at least one quantization index encoding that part of the parametric spectral representation. Step S12 reconstructs elements of a high-frequency part of the parametric spectral representation by weighted averaging based on the decoded elements flipped around a decoded mirroring frequency, which separates the low-frequency part from the high-frequency part, and a decoded frequency grid.

Figure 8:
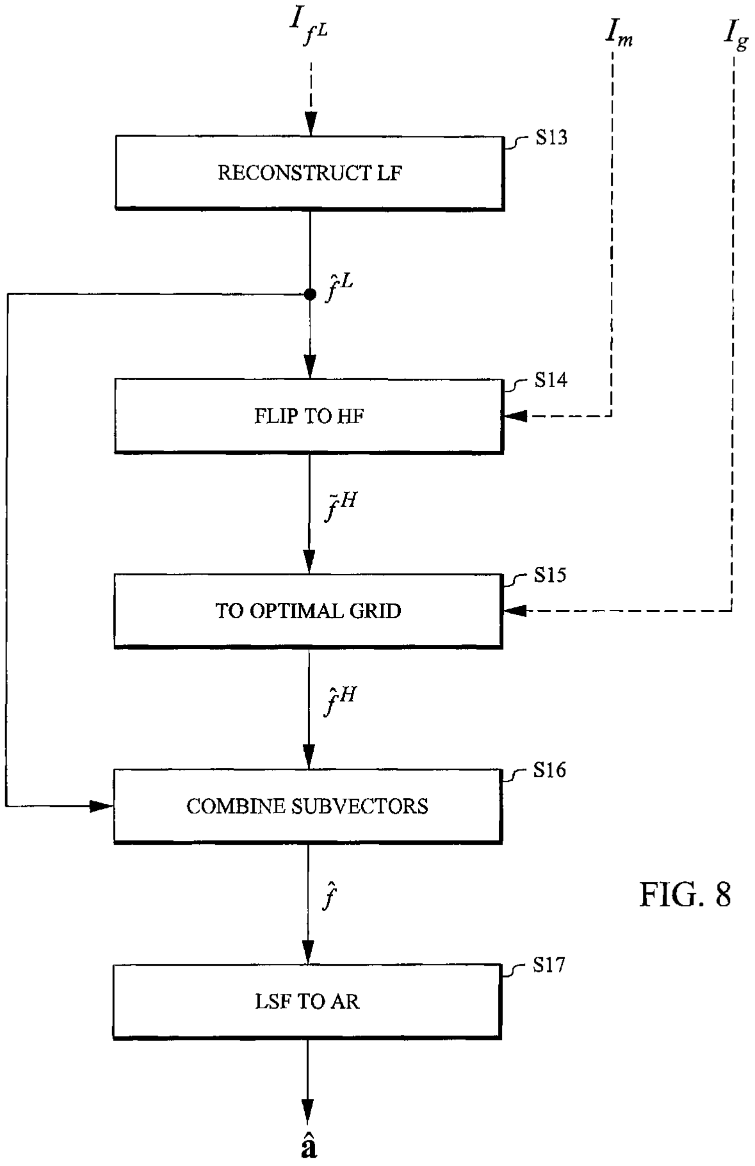
FIG. 8 illustrates an embodiment of the decoder side method of the disclosed technology.

The method steps performed at the decoder are illustrated by the embodiment in FIG. 8. First the quantization indices $I_{f^L}$, $I_m$, $I_g$ for the low-frequency LSFs, optimal mirroring frequency and optimal grid, respectively, are received.

In step S13 the quantized low-frequency part $\hat{f}^L$ is reconstructed from a low-frequency codebook by using the received index $I_{f^L}$.

The method steps performed at the decoder for reconstructing the high-frequency part $\hat{f}^H$ are very similar to already described encoder processing steps in equations (3)-(7).

The flipping and rescaling steps performed at the decoder (at S14) are identical to the encoder operations, and therefore described exactly by equations (3)-(4).

The steps (at S15) of rescaling the grid (equation (5)), and smoothing with it (equation (6)), require only slight modification in the decoder, because the closed loop search is not performed (search over i). This is because the decoder receives the optimal index opt from the bit stream. These equations instead take the following form:

$$\tilde{g}^{opt}(k)=g^{opt}(k)\cdot(g_{max}-\hat{f}(M/2-1))+\hat{f}(M/2-1) \qquad (14)$$

and $$f_{smooth}(k)=[1-\lambda(k)]\tilde{f}_{flip}(k)+\lambda(k)\tilde{g}^{opt}(k) \qquad (15)$$

respectively. The vector $f_{smooth}$ represents the high-frequency part $\hat{f}^H$ of the decoded signal.

Finally the low- and high-frequency parts $\hat{f}^L$, $\hat{f}^H$ of the LSF vector are combined in step S16, and the resulting vector $\hat{f}$ is transformed to AR coefficients $\hat{a}$ in step S17.

Figure 9:
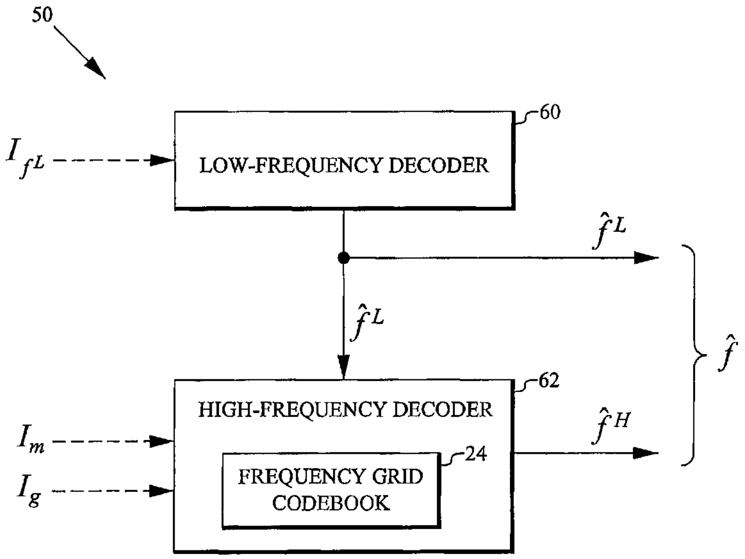
FIG. 9 is a block diagram of an embodiment of the decoder in accordance with the disclosed technology.

FIG. 9 is a block diagram of an embodiment of the decoder 50 in accordance with the disclosed technology. A low-frequency decoder 60 is configures to reconstruct elements $\hat{f}^L$ of a low-frequency part $f^L$ of the parametric spectral representation f corresponding to a low-frequency part of the audio signal from at least one quantization index $I_{f^L}$ encoding that part of the parametric spectral representation. A high-frequency decoder 62 is configured to reconstruct elements $\hat{f}^H$ of a high-frequency part $f^H$ of the parametric spectral representation by weighted averaging based on the decoded elements $\hat{f}^L$ flipped around a decoded mirroring frequency $\hat{f}_m$, which separates the low-frequency part from the high-frequency part, and a decoded frequency grid $g^{opt}$. The frequency grid $g^{opt}$ is obtained by retrieving the frequency grid that corresponds to a received index $I_g$ from a frequency grid codebook 24 (this is the same codebook as in the encoder).

Figure 10:
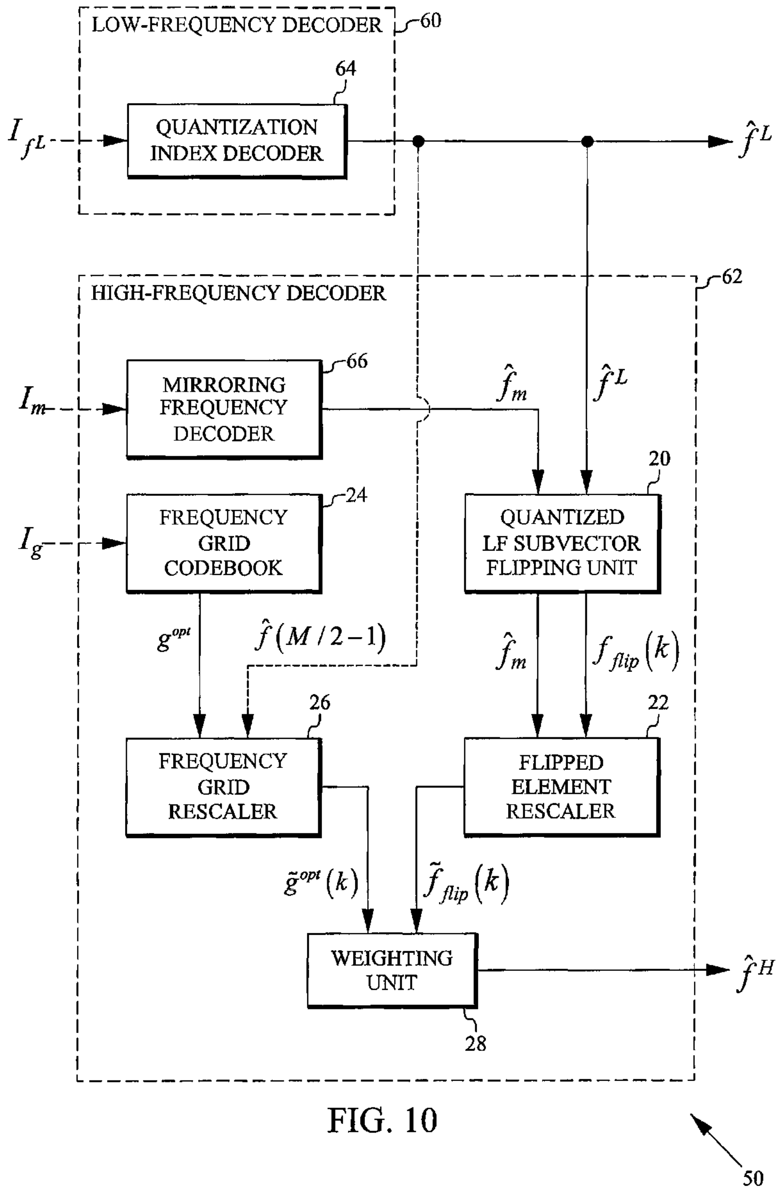
FIG. 10 is a block diagram of an embodiment of the decoder in accordance with the disclosed technology.

FIG. 10 is a block diagram of an embodiment of the decoder in accordance with the disclosed technology. The low-frequency decoder receives at least one quantization index $I_{f^L}$, depending on whether scalar or vector quantization is used, and forwards it to a quantization index decoder 66, which reconstructs elements $\hat{f}^L$ of the low-frequency part of the parametric spectral representation. The high-frequency decoder 62 receives a mirroring frequency quantization index $I_m$, which is forwarded to a mirroring frequency decoder 66 for decoding the mirroring frequency $\hat{f}_m$. The remaining blocks 20, 22, 24, 26 and 28 perform the same functions as the correspondingly numbered blocks in the encoder illustrated in FIG. 6. The essential differences between the encoder and the decoder are that the mirroring frequency is decoded from the index $I_m$ instead of being calculated from equation (2), and that the frequency grid search unit 30 in the encoder is not required, since the optimal frequency grid is obtained directly from frequency grid codebook 24 by looking up the frequency grid $g^{opt}$ that corresponds to the received index $I_g$.

The steps, functions, procedures and/or blocks described herein may be implemented in hardware using any conventional technology, such as discrete circuit or integrated circuit technology, including both general-purpose electronic circuitry and application-specific circuitry.

Alternatively, at least some of the steps, functions, procedures and/or blocks described herein may be implemented in software for execution by suitable processing equipment. This equipment may include, for example, one or several micro processors, one or several Digital Signal Processors (DSP), one or several Application Specific Integrated Circuits (ASIC), video accelerated hardware or one or several suitable programmable logic devices, such as Field Programmable Gate Arrays (FPGA). Combinations of such processing elements are also feasible.

It should also be understood that it may be possible to reuse the general processing capabilities already present in a UE. This may, for example, be done by reprogramming of the existing software or by adding new software components.

Figure 11:
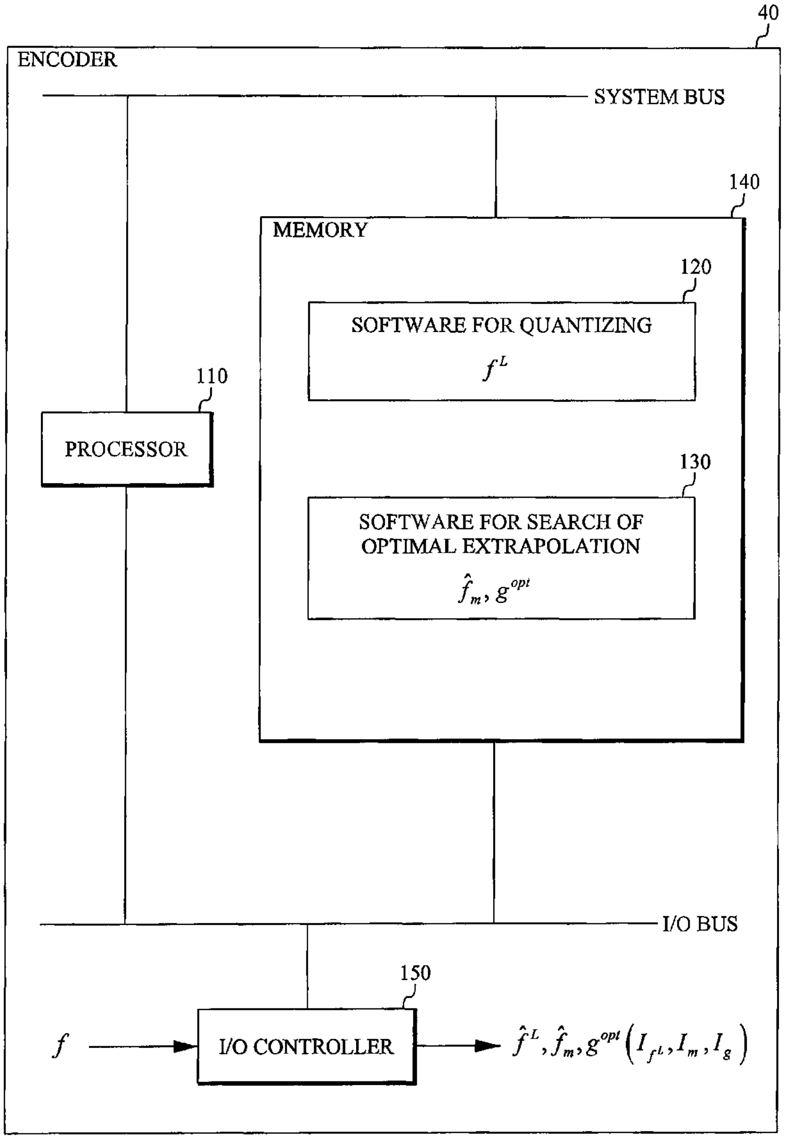
FIG. 11 is a block diagram of an embodiment of the encoder in accordance with the disclosed technology.

FIG. 11 is a block diagram of an embodiment of the encoder 40 in accordance with the disclosed technology. This embodiment is based on a processor 110, for example a micro processor, which executes software 120 for quantizing the low-frequency part $f^L$ of the parametric spectral representation, and software 130 for search of an optimal extrapolation represented by the mirroring frequency $\hat{f}_m$ and the optimal frequency grid vector $g^{opt}$. The software is stored in memory 140. The processor 110 communicates with the memory over a system bus. The incoming parametric spectral representation f is received by an input/output (I/O) controller 150 controlling an I/O bus, to which the processor 110 and the memory 140 are connected. The software 120 may implement the functionality of the low-frequency encoder 10. The software 130 may implement the functionality of the high-frequency encoder 12. The quantized parameters $\hat{f}^L$, $\hat{f}_m$, $g^{opt}$ (or preferably the corresponding indices $I_{f^L}$, $I_m$, $I_g$) obtained from the software 120 and 130 are outputted from the memory 140 by the I/O controller 150 over the I/O bus.

Figure 12:
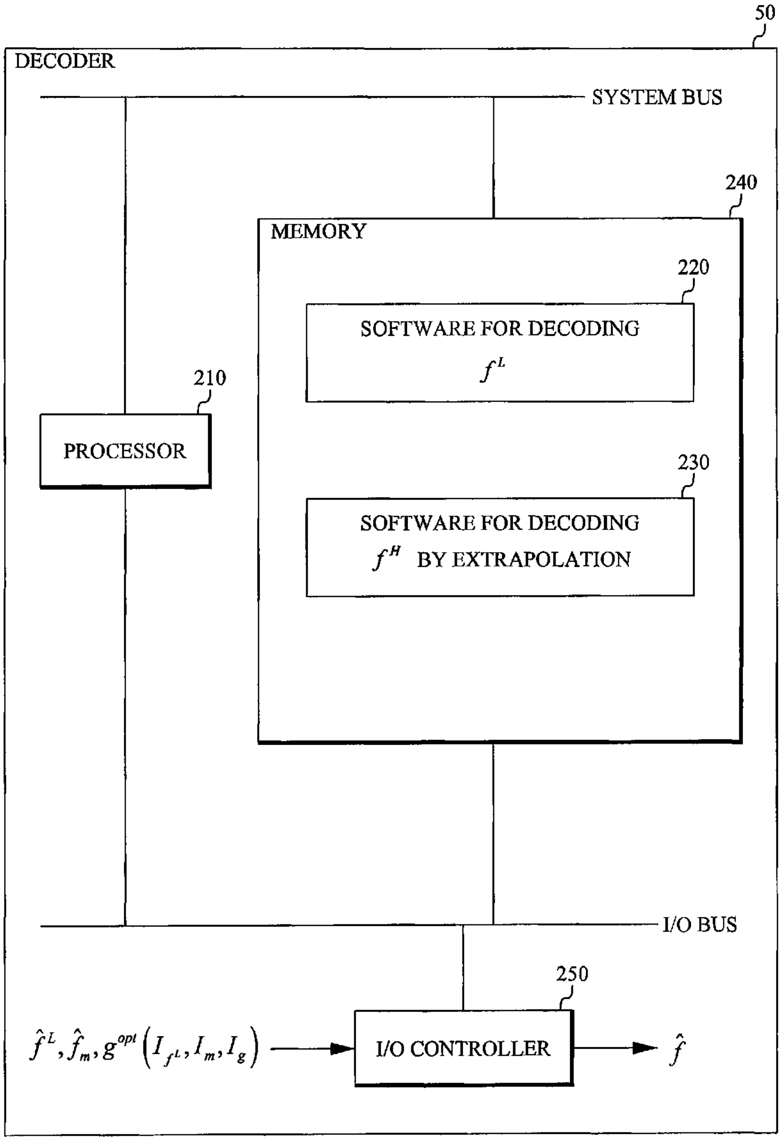
FIG. 12 is a block diagram of an embodiment of the decoder in accordance with the disclosed technology.

FIG. 12 is a block diagram of an embodiment of the decoder 50 in accordance with the disclosed technology. This embodiment is based on a processor 210, for example a micro processor, which executes software 220 for decoding the low-frequency part $f^L$ of the parametric spectral representation, and software 230 for decoding the low-frequency part $f^H$ of the parametric spectral representation by extrapolation. The software is stored in memory 240. The processor 210 communicates with the memory over a system bus. The incoming encoded parameters $\hat{f}^L$, $\hat{f}_m$, $g^{opt}$ (represented by $I_{f^L}$, $I_m$, $I_g$) are received by an input/output (I/O) controller 250 controlling an I/O bus, to which the processor 210 and the memory 240 are connected. The software 220 may implement the functionality of the low-frequency decoder 60. The software 230 may implement the functionality of the high-frequency decoder 62. The decoded parametric representation $\hat{f}$ ($\hat{f}^L$ combined with $\hat{f}^H$) obtained from the software 220 and 230 are outputted from the memory 240 by the I/O controller 250 over the I/O bus.

Figure 13:
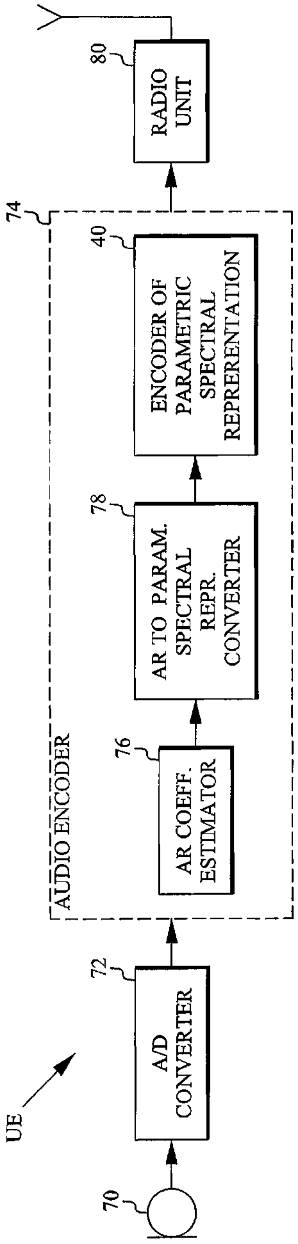
FIG. 13 illustrates an embodiment of a user equipment including an encoder in accordance with the disclosed technology.

FIG. 13 illustrates an embodiment of a user equipment UE including an encoder in accordance with the disclosed technology. A microphone 70 forwards an audio signal to an A/D converter 72. The digitized audio signal is encoded by an audio encoder 74. Only the components relevant for illustrating the disclosed technology are illustrated in the audio encoder 74. The audio encoder 74 includes an AR coefficient estimator 76, an AR to parametric spectral representation converter 78 and an encoder 40 of the parametric spectral representation. The encoded parametric spectral representation (together with other encoded audio parameters that are not needed to illustrate the present technology) is forwarded to a radio unit 80 for channel encoding and up-conversion to radio frequency and transmission to a decoder over an antenna.

Figure 14:
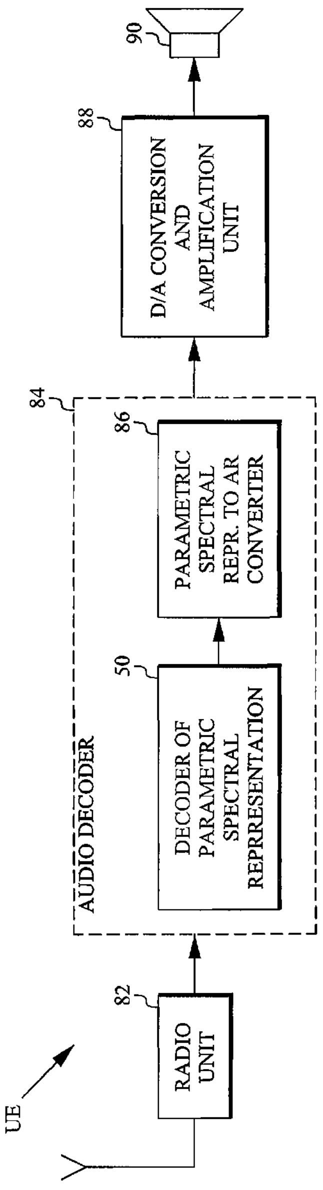
FIG. 14 illustrates an embodiment of a user equipment including a decoder in accordance with the disclosed technology.

FIG. 14 illustrates an embodiment of a user equipment UE including a decoder in accordance with the disclosed technology. An antenna receives a signal including the encoded parametric spectral representation and forwards it to radio unit 82 for down-conversion from radio frequency and channel decoding. The resulting digital signal is forwarded to an audio decoder 84. Only the components relevant for illustrating the disclosed technology are illustrated in the audio decoder 84. The audio decoder 84 includes a decoder 50 of the parametric spectral representation and a parametric spectral representation to AR converter 86. The AR coefficients are used (together with other decoded audio parameters that are not needed to illustrate the present technology) to decode the audio signal, and the resulting audio samples are forwarded to a D/A conversion and amplification unit 88, which outputs the audio signal to a loudspeaker 90.

In one example application the disclosed AR quantization-extrapolation scheme is used in a BWE context. In this case AR analysis is performed on a certain high frequency band, and AR coefficients are used only for the synthesis filter. Instead of being obtained with the corresponding analysis filter, the excitation signal for this high band is extrapolated from an independently coded low band excitation.

In another example application the disclosed AR quantization-extrapolation scheme is used in an ACELP type coding scheme. ACELP coders model a speaker's vocal tract with an AR model. An excitation signal e(n) is generated by passing a waveform s(n) through a whitening filter e(n)=A(z)s(n), where $A(z)=1+a_1z^{-1}+a_2z^{-1}+ \ldots +a_Mz^{-M}$, is the AR model of order M. On a frame-by-frame basis a set of AR coefficients $a=[a_1a_2 \ldots a_M]^T$, and excitation signal are quantized, and quantization indices are transmitted over the network. At the decoder, synthesized speech is generated on a frame-by-frame basis by sending the reconstructed excitation signal through the reconstructed synthesis filter $A(z)^{-1}$.

In a further example application, the disclosed AR quantization-extrapolation scheme is used as an efficient way to parameterize a spectrum envelope of a transform audio codec. On short-time basis the waveform is transformed to frequency domain, and the frequency response of the AR coefficients is used to approximate the spectrum envelope and normalize transformed vector (to create a residual vector). Next the AR coefficients and the residual vector are coded and transmitted to the decoder.

It will be understood by those skilled in the art that various modifications and changes may be made to the disclosed technology without departure from the scope thereof, which is defined by the appended claims.

Abbreviations

ACELP Algebraic Code Excited Linear Prediction
ASIC Application Specific Integrated Circuits
AR Auto Regression
BWE Bandwidth Extension
DSP Digital Signal Processor
FPGA Field Programmable Gate Array
ISP Immitance Spectral Pairs
LP Linear Prediction
LSF Line Spectral Frequencies
LSP Line Spectral Pair
MSE Mean Squared Error
SD Spectral Distortion
SQ Scalar Quantizer
UE User Equipment
VQ Vector Quantization

REFERENCES

[1] 3GPP TS 26.090, "Adaptive Multi-Rate (AMR) speech codec; Transcoding functions", p. 13, 2007.
[2] N. Iwakami, et al., High-quality audio-coding at less than 64 kbit/s by using transform-domain weighted interleave vector quantization (TWINVQ), IEEE ICASSP, vol. 5, pp. 3095-3098, 1995.
[3] J. Makhoul, "Linear prediction: A tutorial review", Proc. IEEE, vol 63, p. 566, 1975.
[4] P. Kabal and R. P. Ramachandran, "The computation of line spectral frequencies using Chebyshev polynomials", IEEE Trans. on ASSP, vol. 34, no. 6, pp. 1419-1426, 1986.

What is claimed is:

1. A method, in a digital circuit, of decoding a digitally encoded line spectral frequencies (LSF) representation of linear prediction coefficients that partially represent an audio signal, said method comprising:

reconstructing coefficients of a low-frequency part of the LSF representation corresponding to a low-frequency part of the audio signal, from indices representing the coefficients of the low-frequency part;

reconstructing coefficients of a high-frequency part of the LSF representation based on a decoded frequency grid and based on flipping the decoded coefficients for the low-frequency part around a decoded mirroring frequency that separates the low-frequency part from the high-frequency part.

2. The method of claim 1, further comprising receiving the at least one quantization index indices representing the quantized coefficients, an index representing the quantized mirroring frequency, and an index representing the frequency grid, prior to performing said reconstructing operations.

3. The decoding method of claim 1, including the step of flipping the decoded coefficients of the low-frequency part around the mirroring frequency in accordance with:

$$f_{flip}(k)=2\hat{f}_m-\hat{f}(M/2-1-k),0\le k\le M/2-1$$

where $\hat{f}_m$ is the mirroring frequency,

M denotes the total number of coefficients in the LSF representation, $\hat{f}(M/2-1-k)$ denotes decoded coefficient M/2−1−k, and $f_{flip}(k)$ are the flipped coefficients.

4. The decoding method of claim 3, including the step of rescaling the flipped coefficients $f_{flip}(k)$ in accordance with:

$$\tilde{f}_{flip}(k)=\begin{cases}(f_{flip}(k)-f_{flip}(0))\cdot(f_{max}-\hat{f}_m)/\hat{f}_m+f_{flip}(0), & \hat{f}_m>0.25\\ f_{flip}(k), & \text{otherwise}\end{cases}.$$

5. The decoding method of claim 4, including the step of rescaling the decoded frequency grid to fit into the interval between the last quantized coefficient $\hat{f}(M/2-1)$ in the low-frequency part and a maximum grid point value $g_{max}$ in accordance with:

$$\tilde{g}^{opt}(k)=g^{opt}(k)\cdot(g_{max}-\hat{f}(M/2-1))+\hat{f}(M/2-1),$$

where $g^{opt}$ is the decoded frequency grid.

6. The decoding method of claim 5, including the step of weighted averaging of the flipped and rescaled coefficients $\tilde{f}_{flip}(k)$ and the rescaled frequency grid $\tilde{g}^{opt}(k)$ in accordance with:

$$f_{smooth}(k)=[1-\lambda(k)]\tilde{f}_{flip}(k)+\lambda(k)\tilde{g}^{opt}(k),$$

where λ(k) and [1−λ(k)] are predefined weights.

7. The decoding method of claim 6, wherein M=10, $g_{max}$=0.5, and the weights λ(k) are defined as λ={0.2, 0.35, 0.5, 0.75, 0.8}.

8. A decoder circuit for decoding an encoded line spectral frequencies (LSF) representation ($\hat{f}$) of linear prediction coefficients (a) that partially represent an audio signal, said decoder circuit including:

a low-frequency decoder circuit configured to reconstruct coefficients of a low-frequency part of the LSF representation corresponding to a low-frequency part of the audio signal, from indices representing the coefficients of the low-frequency part;

a high-frequency decoder circuit configured to reconstruct coefficients of a high-frequency part of the LSF representation based on a decoded frequency grid and based on flipping the decoded coefficients for the low-frequency part around a decoded mirroring frequency that separates the low-frequency part from the high-frequency part.

9. The decoder circuit of claim 8, wherein the decoder circuit further comprises a receiving circuit configured to receive the at least one quantization index ($I_f$) indices representing the quantized coefficients, an index representing the quantized mirroring frequency, and an index representing the frequency grid, prior to performing said reconstructing operations.

10. The decoder of claim 8, wherein the high-frequency decoder circuit includes a quantized low-frequency subvector flipping unit configured to flip the decoded coefficients of the low-frequency part around the mirroring frequency in accordance with:

$$f_{flip}(k)=2\hat{f}_m-\hat{f}(M/2-1-k),0\le k\le M/2-1$$

where $\hat{f}_m$ is the mirroring frequency,

M denotes the total number of coefficients in the LSF representation, $\hat{f}(M/2-1-k)$ denotes decoded coefficient M/2−1−k, and $f_{flip}(k)$ are the flipped coefficients.

11. The decoder circuit of claim 10, wherein the high-frequency decoder circuit includes a flipped coefficient rescaler configured to rescale the flipped coefficients $f_{flip}(k)$ in accordance with:

$$\tilde{f}_{flip}(k)=\begin{cases}(f_{flip}(k)-f_{flip}(0))\cdot(f_{max}-\hat{f}_m)/\hat{f}_m+f_{flip}(0), & \hat{f}_m>0.25\\ f_{flip}(k), & \text{otherwise}\end{cases}.$$

12. The decoder circuit of claim 11, wherein the high-frequency decoder circuit includes a frequency grid rescaler configured to rescale the decoded frequency grid $g^{opt}$ to fit into the interval between the last quantized coefficient $\hat{f}(M/2-1)$ in the low-frequency part and a maximum grid point value $g_{max}$ in accordance with:

$$\tilde{g}^{opt}(k)=g^{opt}(k)\cdot(g_{max}-\hat{f}(M/2-1))+\hat{f}(M/2-1),$$

where $g^{opt}$ is the decoded frequency grid.

13. The decoder circuit of claim 12, wherein the high-frequency decoder circuit includes a weighting unit configured to perform weighted averaging of the flipped and rescaled coefficients $\tilde{f}_{flip}(k)$ and the rescaled frequency grid $\tilde{g}^{opt}(k)$ in accordance with:

$$f_{smooth}(k)=[1-\lambda(k)]\tilde{f}_{flip}(k)+\lambda(k)\tilde{g}^{opt}(k),$$

where λ(k) and [1−λ(k)] are predefined weights.

14. The decoder circuit of claim 13, wherein M=10, $g_{max}$=0.5, and the weights λ(k) are defined as λ={0.2, 0.35, 0.5, 0.75, 0.8}.

15. A method, in a digital circuit, of digitally encoding a line spectral frequencies (LSF) representation of linear prediction coefficients that partially represent an audio signal, said method comprising:

encoding a low-frequency part of the LSF representation by quantizing coefficients of the LSF representation corresponding to a low-frequency part of the audio signal;

encoding a high-frequency part of the LSF representation by flipping the quantized coefficients around a quantized mirroring frequency that separates the low-frequency part from the high-frequency part and selecting an optimal frequency grid based on the flipped coefficients.

16. The method of claim 15, further comprising outputting, for transmitting to a decoder, indices representing the quantized coefficients, an index representing the quantized mirroring frequency, and an index representing the frequency grid.

17. The method of claim 15, including the step of flipping the quantized coefficients of the low-frequency part around the quantized mirroring frequency in accordance with:

$$f_{flip}(k)=2\hat{f}_m-\hat{f}(M/2-1-k), 0\leq k\leq M/2-1$$

where $\hat{f}_m$ is the quantized mirroring frequency,

M denotes the total number of coefficients in the parametric spectral representation, $\hat{f}(M/2-1-k)$ denotes decoded coefficient M/2−1−k, and $f_{flip}(k)$ are the flipped coefficients.

18. An encoder circuit for digitally encoding a line spectral frequencies (LSF) representation of linear prediction coefficients that partially represent an audio signal, said encoder circuit including:

a low-frequency encoder circuit configured to encode a low-frequency part of the LSF representation by quantizing coefficients of the LSF representation corresponding to a low-frequency part of the audio signal;

a high-frequency decoder circuit configured to encode a high-frequency part of the LSF representation by flipping the quantized coefficients around a quantized mirroring frequency that separates the low-frequency part from the high-frequency part and selecting an optimal frequency grid based on the flipped coefficients.

19. The encoder circuit of claim 18, wherein the encoder circuit is configured to perform a closed-loop search to select the optimal frequency grid from a set of frequency grids.

20. The method of claim 15, wherein the method comprises performing a closed-loop search to select the optimal frequency grid from a set of frequency grids.

* * * * *